United States Patent
Ansai et al.

(10) Patent No.: US 11,840,651 B2
(45) Date of Patent: Dec. 12, 2023

(54) PRESSURE SENSITIVE ADHESIVE SHEET FOR BATTERIES AND LITHIUM-ION BATTERY

(71) Applicant: LINTEC CORPORATION, Tokyo (JP)

(72) Inventors: Takeshi Ansai, Tokyo (JP); Yuichi Kurata, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 365 days.

(21) Appl. No.: 16/574,234

(22) Filed: Sep. 18, 2019

(65) Prior Publication Data

US 2020/0087544 A1 Mar. 19, 2020

(30) Foreign Application Priority Data

Sep. 19, 2018 (JP) .................................. 2018-175302

(51) Int. Cl.
*C09J 7/38* (2018.01)
*H01M 10/0525* (2010.01)
*H01M 50/46* (2021.01)
*H01M 50/548* (2021.01)

(52) U.S. Cl.
CPC ........... *C09J 7/38* (2018.01); *H01M 10/0525* (2013.01); *H01M 50/46* (2021.01); *H01M 50/548* (2021.01)

(58) Field of Classification Search
CPC .............................. C09J 7/38; H01M 10/0525
See application file for complete search history.

(56) References Cited

U.S. PATENT DOCUMENTS

| | | | |
|---|---|---|---|
| 2004/0175520 A1* | 9/2004 | Van Rijn | B32B 7/12 428/34.9 |
| 2011/0159344 A1 | 6/2011 | Kobayashi et al. | |
| 2014/0193702 A1* | 7/2014 | Woehrle | H01M 50/119 429/176 |
| 2017/0077487 A1* | 3/2017 | Coakley | H01M 50/503 |
| 2017/0084958 A1* | 3/2017 | Ueda | H01M 50/46 |
| 2017/0244087 A1* | 8/2017 | Kawabe | B32B 5/022 |
| 2018/0134923 A1* | 5/2018 | Kurata | C09D 135/02 |
| 2018/0155582 A1* | 6/2018 | Ansai | C09J 7/29 |
| 2018/0159166 A1* | 6/2018 | Ansai | C09J 7/25 |
| 2018/0159167 A1* | 6/2018 | Ansai | H01M 50/528 |
| 2018/0241026 A1* | 8/2018 | Shibutani | H01M 10/0587 |

(Continued)

FOREIGN PATENT DOCUMENTS

| | | | |
|---|---|---|---|
| JP | 2008-258518 A | | 10/2008 |
| JP | 2009256395 | * | 11/2009 |
| JP | 2009256395 A | * | 11/2009 |

(Continued)

OTHER PUBLICATIONS

Office Action for JP App. No. 2018-175302, dated Mar. 22, 2022 (w/ translation).

*Primary Examiner* — Scott J. Chmielecki
(74) *Attorney, Agent, or Firm* — Greenblum & Bernstein, P.L.C

(57) ABSTRACT

A pressure sensitive adhesive sheet for batteries that includes a base material, a vapor-deposition insulating film provided on one surface side of the base material, and a pressure sensitive adhesive layer provided on a surface side of the vapor-deposition insulating film opposite to the base material.

4 Claims, 2 Drawing Sheets

(56) References Cited

U.S. PATENT DOCUMENTS

2020/0087545 A1\* 3/2020 Ansai .................... H01M 50/46
2020/0087546 A1\* 3/2020 Ansai .................... H01M 50/46

FOREIGN PATENT DOCUMENTS

| JP | 2011-138632 | | 7/2011 | |
|----|-------------|---|--------|---|
| JP | 5639733 | | 12/2014 | |
| JP | 2018-92875 | | 6/2018 | |
| WO | 2013/133167 | | 9/2013 | |
| WO | WO2913133167 | \* | 9/2013 | |
| WO | WO-2016194093 A1 | \* | 12/2016 | ............. C08K 3/013 |

\* cited by examiner

PRESSURE SENSITIVE ADHESIVE SHEET FOR BATTERIES AND LITHIUM-ION BATTERY

TECHNICAL FIELD

The present invention relates to a pressure sensitive adhesive sheet for batteries and a lithium-ion battery manufactured using the pressure sensitive adhesive sheet for batteries.

BACKGROUND ART

In some batteries, strip-like laminates are housed inside the batteries in a state of being wound up. Such a laminate is formed by laminating a positive electrode, a negative electrode, and separators located between the positive and negative electrodes. The positive and negative electrodes are connected to respective electrode lead-out tabs of conductors, which electrically connect the positive and negative electrodes respectively to a positive electrode terminal and a negative electrode terminal of the battery.

Pressure sensitive adhesive tapes may be used as a stopper for the above wound-up laminate and/or used for fixation of the electrode lead-out tabs to the electrodes. Patent Documents 1 and 2 disclose such pressure sensitive adhesive tapes. These pressure sensitive adhesive tapes are each composed of a base material and a pressure sensitive adhesive layer provided on one surface of the base material.

The pressure sensitive adhesive tape used inside a battery as described above preferably has insulation properties to prevent a short circuit inside the battery. In this context, Patent Document 3 proposes a pressure sensitive adhesive sheet for batteries in which a base material is provided with a hard coat layer formed of a sol of metal oxide having insulation properties.

PRIOR ART DOCUMENTS

Patent Documents

[Patent Document 1] JP5639733B
[Patent Document 2] JP2011-138632A
[Patent Document 3] JP2018-092875A

SUMMARY OF THE INVENTION

Problems to be Solved by the Invention

When a short circuit occurs inside a battery, the battery is liable to generate heat, and if the amount of heat generation is large, a serious accident may occur. It is therefore desired that the pressure sensitive adhesive tapes used inside batteries have high insulation properties that can suppress the amount of heat generation even if an internal short circuit occurs.

The present invention has been made in consideration of such actual circumstances and an object of the present invention is to provide a pressure sensitive adhesive sheet for batteries that has high insulation properties. Another object of the present invention is to provide a lithium-ion battery in which the pressure sensitive adhesive sheet for batteries is used.

Means for Solving the Problems

To achieve the above objects, first, the present invention provides a pressure sensitive adhesive sheet for batteries, comprising: a base material; a vapor-deposition insulating film provided on one surface side of the base material; and a pressure sensitive adhesive layer provided on a surface side of the vapor-deposition insulating film opposite to the base material (Invention 1).

Owing to the presence of the vapor-deposition insulating film, the pressure sensitive adhesive sheet for batteries according to the above invention (Invention 1) is excellent in the insulation properties when used in an ordinary way and even heated to high temperatures and/or immersed in an electrolyte solution for a long time. Moreover, even if a short circuit occurs in the pressure sensitive adhesive sheet for batteries, the amount of heat generation can be suppressed low because the vapor-deposition insulating film is free from an organic component and the insulating inorganic component or components form a film at a high density.

In the above invention (Invention 1), a material that forms the vapor-deposition insulating film may preferably comprise at least one selected from the group consisting of aluminum oxide, titanium oxide, zirconium oxide, silicon oxide, aluminum nitride, silicon nitride, boron nitride, and barium sulfate (Invention 2).

Second, the present invention provides a lithium-ion battery in which two or more conductors are fixed in a state of being in contact with each other inside the battery using the above pressure sensitive adhesive sheet for batteries (Invention 1, 2) (Invention 3).

Advantageous Effect of the Invention

The pressure sensitive adhesive sheet for batteries and the lithium-ion battery according to the present invention have high insulation properties and can suppress the amount of heat generation even if an internal short circuit occurs.

EMBODIMENTS FOR CARRYING OUT THE INVENTION

Hereinafter, one or more embodiments of the present invention will be described.

<Pressure Sensitive Adhesive Sheet for Batteries>

Figure 1:
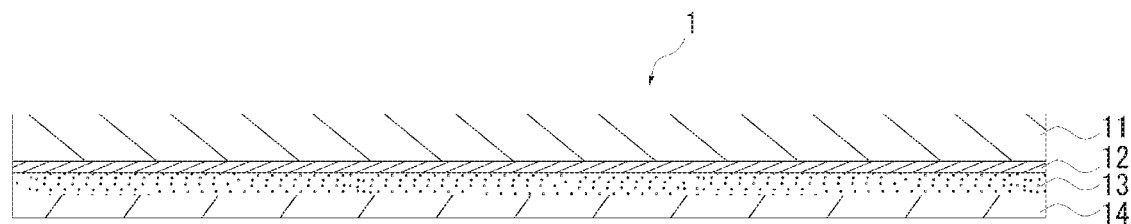
FIG. 1 is a cross-sectional view of a pressure sensitive adhesive sheet for batteries according to an embodiment, of the present invention.

As illustrated in FIG. 1, a pressure sensitive adhesive sheet for batteries 1 according to an embodiment of the present invention may be composed of a base material 11, a vapor-deposition insulating film 12 provided on one surface side of the base material 11, a pressure sensitive adhesive layer 13 provided on the side of the vapor-deposition insulating film 12 opposite to the base material 11, and a release sheet 14 provided on the side of the pressure sensitive adhesive layer 13 opposite to the vapor-deposition insulating film 12.

Here, the "pressure sensitive adhesive sheet for batteries" in the present description is a pressure-sensitive adhesive sheet used at a site at which there is a possibility of contact with an electrolyte solution when manufacturing a battery.

Preferably, it may be a pressure sensitive adhesive sheet, used inside a battery and may also be a pressure sensitive adhesive sheet for battery interior. The battery may preferably be a nonaqueous battery. Accordingly, the electrolyte solution used in the battery may preferably be a nonaqueous electrolyte solution. The pressure sensitive adhesive sheet for batteries in the present description may preferably be a pressure sensitive adhesive sheet that, is attached to a site at which there is a possibility of immersion in an electrolyte solution inside a nonaqueous battery or a site at which there is a possibility of contact with the electrolyte solution. A lithium-ion battery may be particularly preferred as the nonaqueous battery.

The "vapor-deposition insulating film" in the present description refers to a thin film formed by a vapor-phase (dry) deposition method and having insulation properties. That is, the "vapor-deposition insulating film" in the present description does not encompass a film formed by a liquid-phase (wet) deposition method such as a coating method, a sol-gel method, or a plating method. The vapor-deposition insulating film is free from an organic component because one or more insulating inorganic materials are used in the film formation method and no organic material is used.

The pressure sensitive adhesive sheet for batteries 1 according to the present embodiment is excellent in the insulation properties in an ordinary state because the vapor-deposition insulating film 12 serves as an insulation layer. Moreover, even if the pressure sensitive adhesive sheet for batteries 1 according to the present embodiment is exposed to high temperatures and carbonization or the like occurs in the matrix (organic component) of the base material 11 and/or even if a high voltage is partially applied to the pressure sensitive adhesive sheet for batteries 1 to flow a current through the pressure sensitive adhesive sheet for batteries 1 in its thickness direction and paths for the current in the base material 11 change into conductor paths, the insulation properties of the pressure sensitive adhesive sheet for batteries 1 itself can be ensured because the vapor-deposition insulating film 12 free from an organic component remains without being carbonized. Furthermore, in the pressure sensitive adhesive sheet for batteries 1, the vapor-deposition insulating film 12 exists at a location nearer to an adherend and, therefore, formation of alternative paths for the conductor paths due to insulation breakdown will be more difficult.

In some cases, hydrofluoric acid may be generated when water reacts with a salt, such as lithium hexafluorophosphate, which is an electrolyte in an electrolyte solution. The inorganic material or materials contained in the vapor-deposition insulating film 12 of the pressure sensitive adhesive sheet for batteries 1 according to the present embodiment have low decomposability and solubility to the hydrofluoric acid and are therefore less likely to escape from the vapor-deposition insulating film 12 even when the pressure sensitive adhesive sheet for batteries 1 is immersed in the electrolyte solution of a battery for a long time. Thus, the pressure sensitive adhesive sheet for batteries 1 according to the present embodiment is excellent in the insulation properties even when immersed in an electrolyte solution for a long time and when heated to high temperatures thereafter.

Furthermore, the vapor-deposition insulating film 12 of the pressure sensitive adhesive sheet for batteries 1 according to the present embodiment can suppress the amount of heat generation even if a short circuit occurs in the pressure sensitive adhesive sheet for batteries 1. This appears to be because the vapor-deposition insulating film 12 is free from an organic component and the insulating inorganic component or components form a film at a high density.

That is, owing to the presence of the above vapor-deposition insulating film 12, the pressure sensitive adhesive sheet for batteries 1 according to the present embodiment exhibits high insulation properties when used in an ordinary way and even heated to high temperatures and even if an internal short circuit occurs. When a battery is obtained using the pressure sensitive adhesive sheet for batteries 1 according to the present embodiment, having the actions and effects as the above, the safety of the battery can be high.

1. Constitutional Elements 1-1. Base Material

In the pressure sensitive adhesive sheet for batteries 1 according to the present embodiment, the base material 11 may preferably have a high minimum voltage at which insulation breakdown occurs. For example, the minimum voltage may be preferably 1 kV or higher, particularly preferably 2 kv or higher, and further preferably 5 kV or higher. When the minimum voltage is 1 kV or higher, insulation breakdown of the base material 11 is less likely to occur and the reliability of the pressure sensitive adhesive sheet for batteries 1 can be higher.

The base material 11 may preferably have flame retardancy that, satisfies the flame retardancy level V-0 according to the UL 94 standard. When the base material 11 has such flame retardancy, denaturation and deformation of the base material 11 can be suppressed even in a case in which the battery generates heat due to its ordinary use. Moreover, even if troubles occur in the battery and it generates excessive heat, ignition and burning of the base material 11 can be suppressed to prevent a serious accident.

The material of the base material 11 can be appropriately selected from the viewpoints of insulation properties, flame retardancy, heat resistance, reactivity with an electrolyte solution, permeability to an electrolyte solution, and the like. In particular, it may be preferred to use a resin film as the base material 11. Examples of the resin film include films of polyesters such as polyethylene terephthalate, polybutylene terephthalate and polyethylene naphthalate, polyolefin films such as a polyethylene film and a polypropylene film, films of a polymer that contains nitrogen in its main chain, such as a polyamide film, a polyimide film and a polyamideimide film, cellophane, a diacetyl cellulose film, a triacetyl cellulose film, an acetyl cellulose butyrate film, a polyvinyl chloride film, a polyvinylidene chloride film, a polyvinyl alcohol film, an ethylene-vinyl acetate copolymer film, a polystyrene film, a polycarbonate film, a polymethylpentene film, a polysulfone film, a polyether ether ketone film, a polyether suit one film, a polyether imide film, a fluorine resin film, an acrylic resin film, a polyurethane resin film, a norbornene-based polymer film, a cyclic olefin-based polymer film, a cyclic conjugated diene-based polymer film, a vinyl alicyclic hydrocarbon polymer film, other resin films, and laminated films thereof. In particular, from the viewpoints of insulation properties and flame retardancy, films of a polymer that contains nitrogen in its main chain (the films may contain other components than the polymer, here and hereinafter) may be preferred, films of a polymer that has a nitrogen-containing ring structure in the main chain may be particularly preferred, and films of a polymer that has a nitrogen-containing ring structure and an aromatic ring structure in the main chain may be further preferred. Specifically, for example, a polyimide film, a polyetherimide film, or a polyether ether ketone film may be preferred, among which the polyimide film may be preferred because it is particularly excellent in the insulation properties and flame retardancy.

The thickness of the base material 11 may be preferably 5 µm or more, particularly preferably 15 µm or more, and further preferably 15 µm or more as the lower limit. When the lower limit of the thickness of the base material 11 satisfies the above, appropriate rigidity is given to the base material 11 and, even in a case in which the cure shrinkage occurs during formation of the vapor-deposition insulating film 12 on the base material 11, the occurrence of curling can be effectively suppressed. From another aspect, the thickness of the base material 11 may be preferably 200 µm or less, particularly preferably 100 µm or less, anti further preferably 40 µm or less as the upper limit. When the upper limit of the thickness of the base material 11 satisfies the above, the pressure sensitive adhesive sheet for batteries 1 can have moderate flexibility and, even in a case in which the pressure sensitive adhesive sheet for batteries 1 is attached to a surface having a height difference, such as in a case in which an electrode and an electrode lead-out tab are fixed to each other, the pressure sensitive adhesive sheet for batteries 1 can well follow the height difference.

1-2. Vapor-Deposition Insulating Film

As previously described, the method of forming the vapor-deposition insulating film 12 of the pressure sensitive adhesive sheet for batteries 1 according to the present embodiment is a vapor-phase (dry) deposition method. The vapor deposition may be physical vapor deposition (PVD) or may also be chemical vapor deposition (CVD). Examples of the physical vapor deposition include vacuum vapor deposition, molecular beam epitaxy, ion plating, and sputtering. Examples of the chemical vapor deposition include thermal CVD and plasma CVD. The vapor deposition is not particularly limited, provided that an insulating thin film can be formed for the above base material 11. Among the above, vacuum vapor deposition, sputtering, thermal CVD and the like may be preferred, and sputtering may be particularly preferred.

The film formation material used in the above vapor-deposition is an insulating inorganic material, and specific examples thereof include aluminum oxide, titanium oxide, zirconium oxide, silicon oxide, aluminum nitride, silicon nitride, boron nitride, and barium sulfate. These may each be used alone and two or more types may also be used in combination. Among the above, aluminum oxide, titanium oxide, or boron nitride may be preferred and aluminum oxide or titanium oxide may be particularly preferred from the viewpoints of insulation properties, film strength, safety, and the like.

The thickness of the vapor-deposition insulating film 12 may be preferably 1 nm or more, particularly preferably 5 nm or more, and further preferably 10 nm or more as the lower limit. When the lower limit of the thickness of the vapor-deposition insulating film 12 satisfies the above, the previously described insulation properties can be more excellent. From another aspect, the thickness of the vapor-deposition insulating film 12 may be preferably 1,000 nm or less, particularly preferably 500 nm or less, and further preferably 300 nm or less as the upper limit. When the upper limit of the thickness of the vapor-deposition insulating film 12 satisfies the above, delamination of the vapor-deposition insulating film 12 from the base material 11 can be effectively suppressed in cases of bending the pressure sensitive adhesive sheet for batteries 1 and other similar cases.

1-3. Pressure Sensitive Adhesive Layer

A pressure sensitive adhesive that constitutes the pressure sensitive adhesive layer 13 is not particularly limited and can be appropriately selected from the viewpoints of solubility in an electrolyte solution, flame retardancy, heat resistance, insulation properties, and the like. In particular, an acrylic-based pressure sensitive adhesive, a silicone-based pressure sensitive adhesive, a rubber-based pressure sensitive adhesive, and a urethane-based pressure sensitive adhesive may be preferred as the pressure sensitive adhesive which constitutes the pressure sensitive adhesive layer 13. The pressure sensitive adhesive may be any of an emulsion type, a solvent type, or a non-solvent type and may also be any of a crosslinked type or a non-crosslinked type. Among the above, an acrylic-based pressure sensitive adhesive may be preferred, a crosslinked-type acrylic-based pressure sensitive adhesive may be particularly preferred, and a solvent and crosslinked-type acrylic-based pressure sensitive adhesive may be further preferred, from the viewpoints of the interfacial adhesion with the vapor-deposition insulating film 12, the adhesion property with electrodes or the like, ease of fine adjustment of the adhesive strength, etc.

The acrylic-based pressure sensitive adhesive may preferably be obtained from a pressure sensitive adhesive composition that contains a (meth)acrylic ester polymer (A) (this composition may be referred to as a "pressure sensitive adhesive composition P," hereinafter). The pressure sensitive adhesive composition P may preferably contain a crosslinker (B) together with the (meth)acrylic ester polymer (A). As used in the present description, the term "(meth)acrylic ester" refers to both the acrylic ester and the methacrylic ester. The same applies to other similar terms. As used in the present description, the term "polymer" encompasses the concept of a "copolymer."

(1) Components (1-1) (Meth)Acrylic Ester Polymer (A)

The (meth)acrylic ester polymer (A) may contain (meth)acrylic alkyl ester in which the carbon number of alkyl group is 1 to 20, as the monomer unit which constitutes the polymer, thereby to exhibit a preferred pressure sensitive adhesive property. Examples of the (meth)acrylic alkyl ester in which the carbon number of alkyl group is 1 to 20 include methyl (meth)acrylate, ethyl (meth)acrylate, propyl (meth)acrylate, n-butyl (meth)acrylate, n-pentyl (meth)acrylate, n-hexyl (meth)acrylate, 2-ethylhexyl (meth)acrylate, isooctyl (meth)acrylate, n-decyl (meth)acrylate, n-lauryl (meth)acrylate, myristyl (meth)acrylate, palmityl (meth)acrylate, and stearyl (meth)acrylate. Among these, (meth)acrylic ester in which the carbon number of alkyl group is 2 to 16 may be preferred, and (meth)acrylic ester in which the carbon number of alkyl group is 3 to 12 may be particularly preferred, from the viewpoint of further improving the pressure sensitive adhesive property. These may each be used alone and two or more types may also be used in combination.

The (meth)acrylic ester polymer (A) may preferably contain 50 mass % or more, particularly preferably 60 mass % or more, and further preferably 70 mass % or more of the (meth)acrylic alkyl ester in which the carbon number of alkyl group is 1 to 20, as the monomer unit which constitutes the polymer. When containing 50 mass % or more of the above (meth)acrylic alkyl ester, the (meth)acrylic ester polymer (A) can exhibit an appropriate pressure sensitive adhesive property. From another aspect, the (meth)acrylic ester polymer (A) may preferably contain 99 mass % or less, particularly preferably 97 mass % or less, and further preferably 95 mass % or less of the (meth)acrylic alkyl ester in which the carbon number of alkyl group is 1 to 20, as the monomer unit which constitutes the polymer. When the content of the above (meth)acrylic alkyl ester is 99 mass % or less, an appropriate amount of other monomer components can be introduced into the (meth)acrylic ester polymer (A).

The (meth)acrylic ester polymer (A) may optionally contain other monomers as the monomer unit which constitutes the polymer. Examples of the other monomers include a monomer that contains a reactive functional group and a monomer that does not contain a reactive functional group.

Examples of the monomer that contains a reactive functional group (reactive functional group-containing monomer) include a monomer having a carboxy group in the molecule (carboxy group-containing monomer), a monomer having a hydroxyl group in the molecule (hydroxyl group-containing monomer), and a monomer having an amino group in the molecule (amino group-containing monomer). The (meth)acrylic ester polymer (A) may preferably contain the hydroxyl group-containing monomer or the carboxy group-containing monomer, among the above, as the monomer unit which constitutes the polymer, and may particularly preferably contain the carboxy group-containing monomer as the monomer unit which constitutes the polymer. The carboxy group-containing monomer can increase the polarity of the obtained pressure sensitive adhesive and enhance the adhesive strength which is measured after immersion in an electrolyte solution.

Examples of the carboxy group-containing monomer include ethylenically unsaturated carboxylic acids such as acrylic acid, methacrylic acid, crotonic acid, maleic acid, itaconic acid, and citraconic acid. Among these, the acrylic acid may be preferred. According to the acrylic acid, the above effects may be more excellent. The above carboxy group-containing monomers may each be used alone and two or more types may also be used in combination.

Examples of the hydroxyl group-containing monomer include hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate. These may each be used alone and two or more types may also be used in combination.

Examples of the amino group-containing monomer include aminoethyl (meth)acrylate and n-butylaminoethyl (meth)acrylate. These may each be used alone and two or more types may also be used in combination.

The (meth)acrylic ester polymer (A) may preferably contain 0.5 mass % or more, particularly preferably 1 mass % or more, and further preferably 3 mass % or more of the reactive functional group-containing monomer as the monomer unit which constitutes the polymer. From another aspect, the (meth)acrylic ester polymer (A) may preferably contain 0.30 mass % or less, particularly preferably 25 mass % or less, and further preferably 20 mass % or less of the reactive functional group-containing monomer as the monomer unit which constitutes the polymer. When the (meth)acrylic ester polymer (A) contains the above amount of the reactive functional group-containing monomer as the monomer unit, a crosslinked structure is well formed by the reaction with the crosslinker (B) to moderately enhance the cohesive strength of the obtained pressure sensitive adhesive layer, and the resistance to dissolution into an electrolyte solution can thereby be more excellent.

Examples of the monomer that does not contain a reactive functional group include alkoxyalkyl (meth)acrylates such as methoxyethyl (meth)acrylate and ethoxyethyl (meth)acrylate, (meth)acrylic esters having a non-crosslinkable tertiary amino group, such as N, N-dimethylaminoethyl (meth)acrylate, N,N-dimethylaminopropyl (meth)acrylate and (meth)acryloyl morpholine, (meth)acrylamide, dimethyl acrylamide, vinyl acetate, and styrene. These may each be used alone and two or more types may also be used in combination.

The (meth)acrylic ester polymer (A) may be a polymer obtained by solution polymerization, a polymer obtained by polymerization without a solvent, or a polymer obtained by emulsion polymerization. Among these, a solution polymerization product obtained by a solution polymerization method may be preferred. Being a solution polymerization product allows a high molecular-weight linear polymer to be readily obtained, and the pressure sensitive adhesive can be obtained with more excellent electrolyte solution resistance.

The polymerization form of the (meth)acrylic ester polymer (A) may be a random copolymer and may also be a block copolymer.

The weight-average molecular weight of the (meth)acrylic ester polymer (A) may be preferably 50,000 or more, more preferably 100,000 or more, particularly preferably 200,000 or more, and further preferably 500,000 or more as the lower limit. When the lower limit of the weight-average molecular weight of the (meth)acrylic ester polymer (A) satisfies the above, the obtained pressure sensitive adhesive can have more excellent resistance to dissolution into an electrolyte solution.

From another aspect, the weight-average molecular weight of the (meth)acrylic ester polymer (A) may be preferably 2,500,000 or less, more preferably 2,000,000 or less, particularly preferably 1,500,000 or less, and further preferably 1,200,000 or less as the upper limit. When the upper limit of the weight-average molecular weight of the (meth)acrylic ester polymer (A) satisfies the above, the adhesive strength of the obtained pressure sensitive adhesive can be more excellent. As used in the present description, the weight-average molecular weight refers to a standard polystyrene equivalent value that is measured using a gel permeation chromatography (GPC) method.

In the pressure sensitive adhesive composition P, one type of the (meth)acrylic ester polymer (A) may be used alone and two or more types may also be used in combination.

(1-2) Crosslinker (B)

It suffices that the crosslinker (B) is reactive with a reactive functional group of the (meth)acrylic ester polymer (A). Examples of the crosslinker (B) include an isocyanate-based crosslinker, an epoxy-based crosslinker, an amine-based crosslinker, a melamine-based crosslinker, an aziridine-based crosslinker, a hydrazine-based crosslinker, an aldehyde-based crosslinker, an oxazoline-based crosslinker, a metal alkoxide-based cross linker, a metal chelate-based crosslinker, a metal salt-based crosslinker, end an ammonium salt-based cross linker. One-type of the cross linker (B) may be used alone and two or more types may also be used in combination.

From the viewpoints of the reactivity with the reactive functional group of the (meth)acrylic ester polymer (A), in particular, with the carboxy group originated from the carboxy group-containing monomer, the electrolyte solution resistance after the reaction, the insulation properties, etc., it may be preferred to use the isocyanate-based crosslinker among the above.

The isocyanate-based cross linker contains at least a polyisocyanate compound. Examples of the polyisocyanate compound include aromatic polyisocyanates such as tolylene diisocyanate, diphenylmethane diisocyanate and xylylene diisocyanate, aliphatic polyisocyanates such as hexamethylene diisocyanate, alicyclic polyisocyanates such as isophorone diisocyanate and hydrogenated diphenylmethane diisocyanate, biuret bodies and isocyanurate bodies thereof, and adduct bodies that are reaction products with low molecular active hydrogen-containing compounds such as ethylene glycol, propylene glycol, neopentyl glycol, trimethylol propane and castor oil. Among these, trimethylolpropane-modified aromatic polyisocyanate may be preferred, and trimethylolpropane-modified tolylene diisocyanate and trimethylolpropane-modified xylylene diisocyanate may be particularly preferred, from the viewpoint of reactivity with hydroxyl groups.

The content of the cross linker (B) in the pressure sensitive adhesive composition P may be preferably 0.1 mass parts or more, particularly preferably 0.5 mass parts or more, and further preferably 1 mass part or more as the lower limit to 100 mass parts of the (meth)acrylic ester polymer (A). From another aspect, the content may be preferably 20 mass parts or less, particularly preferably 15 mass parts or less, and further preferably 10 mass parts or less as the upper limit. When the content of the crosslinker (B) falls within the above range, a cross linked structure is well formed to moderately enhance the cohesive strength of the obtained pressure sensitive adhesive, and the resistance to dissolution into an electrolyte solution can thereby be more excellent.

(1-3) Additives

The pressure sensitive adhesive composition P can optionally contain one or more of various additives, such as a tackifier, an antioxidant, a softening agent and a filler, which are commonly used in an acrylic-based pressure sensitive adhesive. The additives which constitute the pressure sensitive adhesive composition P are deemed not to include a polymerization solvent and a diluent solvent, which will be described later.

Here, the pressure sensitive adhesive composition P may contain insulating inorganic filler. This allows the obtained pressure sensitive adhesive layer 13 to have insulation properties, and the insulation properties of the pressure sensitive adhesive sheet for batteries 1 are more excellent. However, when the pressure sensitive adhesive layer 13 contains the inorganic filler at an amount that ensures the insulation properties, a problem may arise in that the adhesive strength deteriorates consequently. The pressure sensitive adhesive sheet for batteries 1 according to the present embodiment has already achieved high insulation properties because it has the vapor-deposition insulating film 12; therefore, from the viewpoint of maintaining the adhesive strength to be nigh, the pressure sensitive adhesive composition P may preferably not contain insulating inorganic filler.

(2) Production of Pressure Sensitive Adhesive Composition

The pressure sensitive adhesive composition P can be produced through producing the (meth)acrylic ester polymer (A) and optionally adding the cross linker (B), additives and the like to the obtained (meth)acrylic ester polymer (A).

The (meth)acrylic ester polymer (A) can be produced by polymerizing a mixture of the monomers which constitute the polymer using a commonly-used radical polymerization method. Polymerization of the (meth)acrylic ester polymer (A) may preferably be carried out by a solution polymerization method, if desired, using a polymerization initiator. Note, however, that the present invention is not limited to this, and the polymerization may be carried out without a solvent. Examples of the polymerization solvent include ethyl acetate, n-butyl acetate, isobutyl acetate, toluene, acetone, hexane, and methyl ethyl ketone and two or more types thereof may also be used in combination.

Examples of the polymerization initiator include azo-based compounds and organic peroxides and two or more types thereof may also be used in combination. Examples of the azo-based compounds include 2,2'-azobisisobutyronitrile, 2,2'-azobis(2-methylbutyronitrile), 1,1'-azobis(cyclohexane 1-carbonitrile), 2,2'-azobis(2,4-dimethylvaleronitrile), 2,2'-azobis(2,4-dimethyl-4-methoxyvaleronitrile), dimethyl 2,2'-azobis(2-methylpropionate), 4,4'-azobis(4-cyanovaleric acid), 2,2'-azobis(2-hydroxymethylpropionitrile), and 2,2'-azobis[2-(2-imidazolin-2-yl)propane].

Examples or the organic peroxides include benzoyl peroxide, t-butyl perbenzoate, cumene hydroperoxide, diisopropyl peroxydicarbonate, di-n-propyl peroxydicarbonate, di(2-ethoxyethyl)peroxydicarbonate, t-butyl peroxyneodecanoate, t-butyl peroxypivalate, (3,5,5-trimethylhexanoyl) peroxide, dipropionyl peroxide, and diacetyl peroxide.

The weight-average molecular weight of the polymer to be obtained can be adjusted by compounding a chain transfer agent, such as 2-mercaptoethanol, in the above polymerization step.

After the (meth)acrylic ester polymer (A) is obtained, the pressure sensitive adhesive composition P may be obtained through adding the crosslinker (B), additives and the like, if desired, to the solution of the (meth)acrylic ester polymer (A) and sufficiently mixing the solution.

For adjustment of a suitable viscosity for coating and/or adjustment of a desired film thickness of the pressure sensitive adhesive layer, the pressure sensitive adhesive composition P may be appropriately diluted with a diluent solvent or the like in addition to the previously described polymerization solvent to obtain a coating liquid, which will be described later. Examples of the diluent solvent include ethyl acetate, n-butyl acetate, isobutyl acetate, toluene, acetone, hexane, and methyl ethyl ketone and two or more types thereof may also be used in combination.

(3) Pressure Sensitive Adhesive

The pressure sensitive adhesive which constitutes the pressure sensitive adhesive layer 13 may be obtained by crosslinking the previously described pressure sensitive adhesive composition P. Crosslinking of the pressure sensitive adhesive composition P can be usually carried out by heating treatment. The heating treatment can also serve as drying treatment when volatilizing the diluent solvent and the like from the coating film of the pressure sensitive adhesive composition P applied to a desired object.

The heating temperature of the heating treatment may be preferably 50° C. to 150° C. and particularly preferably 70° C. to 120° C. The heating time may be preferably 30 seconds to 10 minutes and particularly preferably 50 seconds to 5 minutes.

After the heating treatment, if necessary, an aging period at an ordinary temperature (e.g., 23° C., 50% RH) for about 1 to 2 weeks may be provided. When the aging period is necessary, the pressure sensitive adhesive may be formed after the aging period passes, while when the aging period is not necessary, the pressure sensitive adhesive may be formed after the heating treatment is completed.

(4) Thickness of Pressure Sensitive Adhesive Layer

The thickness (a value measured in accordance with JIS K7130) of the pressure sensitive adhesive layer 13 may be preferably 1 μm or more, particularly preferably 3 μm or more, and further preferably 5 μm or more as the lower limit. When the lower limit of the thickness of the pressure sensitive adhesive layer 13 satisfies the above, the pressure sensitive adhesive sheet for batteries 1 can exhibit satisfactory adhesive strength. From another aspect, the thickness of the pressure sensitive adhesive layer 13 may be preferably 50 am or less, particularly preferably 15 μm or less, and further preferably 10 μm or less as the upper limit. When the upper limit of the thickness of the pressure sensitive adhesive layer 13 satisfies the above, the amount of electrolyte solution infiltrating into the pressure sensitive adhesive layer 13 from its end parts can be effectively reduced.

1-4. Release Sheet

The release sheet 14 is to protect the pressure sensitive adhesive layer until the use of the pressure sensitive adhesive sheet for batteries 1 and is removed when using the pressure sensitive adhesive sheet for batteries 1. In the pressure sensitive adhesive sheet for batteries 1 according to the present embodiment, the release sheet 14 may not necessarily be required.

Examples of the release sheet 14 for use include a polyethylene film, a polypropylene film, a polybutene film, a polybutadiene film, a polymethylpentene film, a polyvinyl chloride film, a vinyl chloride copolymer film, a polyethylene terephthalate film, a polyethylene naphthalate film, a polybutylene terephthalate film, a polyurethane film, an ethylene-vinyl acetate film, an ionomer resin film, an ethylene-(meth)acrylic acid copolymer film, an ethylene-(meth)acrylic ester copolymer film, a polystyrene film, a polycarbonate film, a polyimide film, a fluorine resin film, and a liquid crystal polymer film. Crosslinked films thereof may also be used. A laminate film obtained by laminating a plurality of such films may also be used.

It may be preferred to perform release treatment for the release surface (surface to be in contact with the pressure sensitive adhesive layer 13) of the release sheet 14. Examples of a release agent used for the release treatment include alkyd-based, silicone-based, fluorine-based, unsaturated polyester-based, polyolefin-based, and wax-based release agents.

The thickness of the release sheet 14 is not particularly limited, but may be usually about 20 to 150 μm.

2. Physical Properties, Etc. Of Pressure Sensitive Adhesive Sheet for Batteries (1) Adhesive Strength The adhesive strength of the pressure sensitive adhesive sheet for batteries 1 according to the present embodiment to an aluminum plate may be preferably 0.5 N/25 mm or more, more preferably 1.0 N/25 mm or more, particularly preferably 2.0 N/25 mm or more, and further preferably 2.5 N/25 mm or more as the lower limit. When the lower limit of the adhesive strength of the pressure sensitive adhesive sheet for batteries 1 satisfies the above, a trouble is less likely to occur that the pressure sensitive adhesive sheet for batteries 1 delaminates from an adherend (in particular, from a metal member). The upper limit of the above adhesive strength is not particularly limited, but may be preferably 50 N/25 mm or less in general, particularly preferably 40 N/25 mm or less, and further preferably 30 N/25 mm or less. As used in the present description, the adhesive strength refers basically to a peel strength that is measured using a method of 180° peeling in accordance with JIS Z0237: 2009. Details of the method of measurement are as described in the Testing Example, which will be described later.

(2) Insulation Properties (Rise in Temperature Due to Forced Internal Short Circuit Test)

When the forced internal short circuit test for a battery is performed in accordance with JIS C8714: 2007 using the pressure sensitive adhesive sheet for batteries 1 (excluding the release sheet 145 and using small nickel pieces of a standard size (height 0.2 mm, width 0.1 mm, L-shaped with a side of 1 mm, angle 90°), the rise in temperature of the battery side surface may be preferably 30° C. or less, particularly preferably 20° C. or less, and further preferably 15° C. or less. When using small nickel pieces of a larger size (height 0.5 mm, width 0.2 mm, L-shaped with a side of 3 mm, angle 90°) than the standard size, the rise m temperature of the battery side surface may be preferably 100° C. or less, particularly preferably 50° C. or less, and further preferably 30° C. or less. Details of the forced internal short circuit test are as described in the Testing Example, which will be described later.

It can be said that when the rise in temperature due to the forced internal short circuit test satisfies the above, the pressure sensitive adhesive sheet for batteries 1 has high insulation properties, and a battery manufactured using the pressure sensitive adhesive sheet for batteries 1 can have high safety. Owing to the presence of the vapor-deposition insulating film 12, the pressure sensitive adhesive sheet for batteries 1 according to the present embodiment allows the rise in temperature due to the forced internal short circuit test to be suppressed low as the above.

(3) Thickness of Pressure Sensitive Adhesive Sheet for Batteries

The thickness of the pressure sensitive adhesive sheet for batteries 1 (excluding the thickness of the release sheet 14) may be preferably 10 μm or more, particularly preferably 15 μm or more, and further preferably 20 μm or more. From another aspect, the thickness of the pressure sensitive adhesive sheet for batteries 1 may be preferably 250 μm or less, particularly preferably 110 μm or less, and further preferably 45 μm or less. When the thickness of the pressure sensitive adhesive sheet for batteries 1 falls within the above range, the pressure sensitive adhesive sheet for batteries 1 can achieve both the adhesive strength and the insulation properties and is thus more preferred.

3. Method of Manufacturing Pressure Sensitive Adhesive Sheet for Batteries

The pressure sensitive adhesive sheet for batteries 1 according to the present embodiment can be manufactured, for example, through producing a laminate of the base material 11 and the vapor-deposition insulating film 12 and a laminate of the pressure sensitive adhesive layer 13 and the release sheet 14 and attaching these laminates to each other so that the vapor-deposition insulating film 12 is in contact with the pressure sensitive adhesive layer 13.

The laminate of the base material 11 and the vapor-deposition insulating film 12 can be obtained by forming the vapor-deposition insulating film 12 on one main surface of the base material 11 using a known vapor deposition method. On the other hand, the laminate of the pressure sensitive adhesive layer 13 and the release sheet 14 can be produced, for example, as follows.

The release surface of the release sheet 14 may be coated with a coating liquid that contains the previously described pressure sensitive adhesive composition P and optionally contains a solvent, and heating treatment may be performed to form a coating film. The coating film formed as such may be the pressure sensitive adhesive layer 13 when an aging period is not necessary. When the aging period is necessary, the formed coating film may become the pressure sensitive adhesive layer 13 after the aging period passes. Conditions for the heating treatment and aging are as previously described.

As the method of coating with the above coating liquid of the pressure sensitive adhesive composition P, for example, a bar coating method, a knife coating method, a roll coating method, a blade coating method, a die coating method, a gravure coating method or the like can be utilized.

Then, the above two laminates are laminated, on each other so that the pressure sensitive adhesive layer 13 is in contact with the vapor-deposition insulating film 12, and the pressure sensitive adhesive sheet for batteries 1 can thereby be manufactured. The aging period for the pressure sensitive adhesive layer 13 may be provided after the lamination with the vapor-deposition insulating film 12.

Another method of manufacturing the pressure sensitive adhesive sheet for batteries 1 according to the present embodiment may include forming the vapor-deposition insulating film 12 and the pressure sensitive adhesive layer 13 in this order on the base material 11 thereby to manufacture the pressure sensitive adhesive sheet for batteries 1.

<Lithium-Ion Battery>

The lithium-ion battery according to an embodiment, of the present invention may be configured such that two or more conductors are fixed in a state of being in contact with each other inside the battery using the previously described pressure sensitive adhesive sheet for batteries 1. It may be preferred that at least one of the two or more conductors be in a sheet-like shape while at least another one be in a line-like or tape-like shape. The lithium-ion battery according to a preferred embodiment will be described below.

Figure 2:
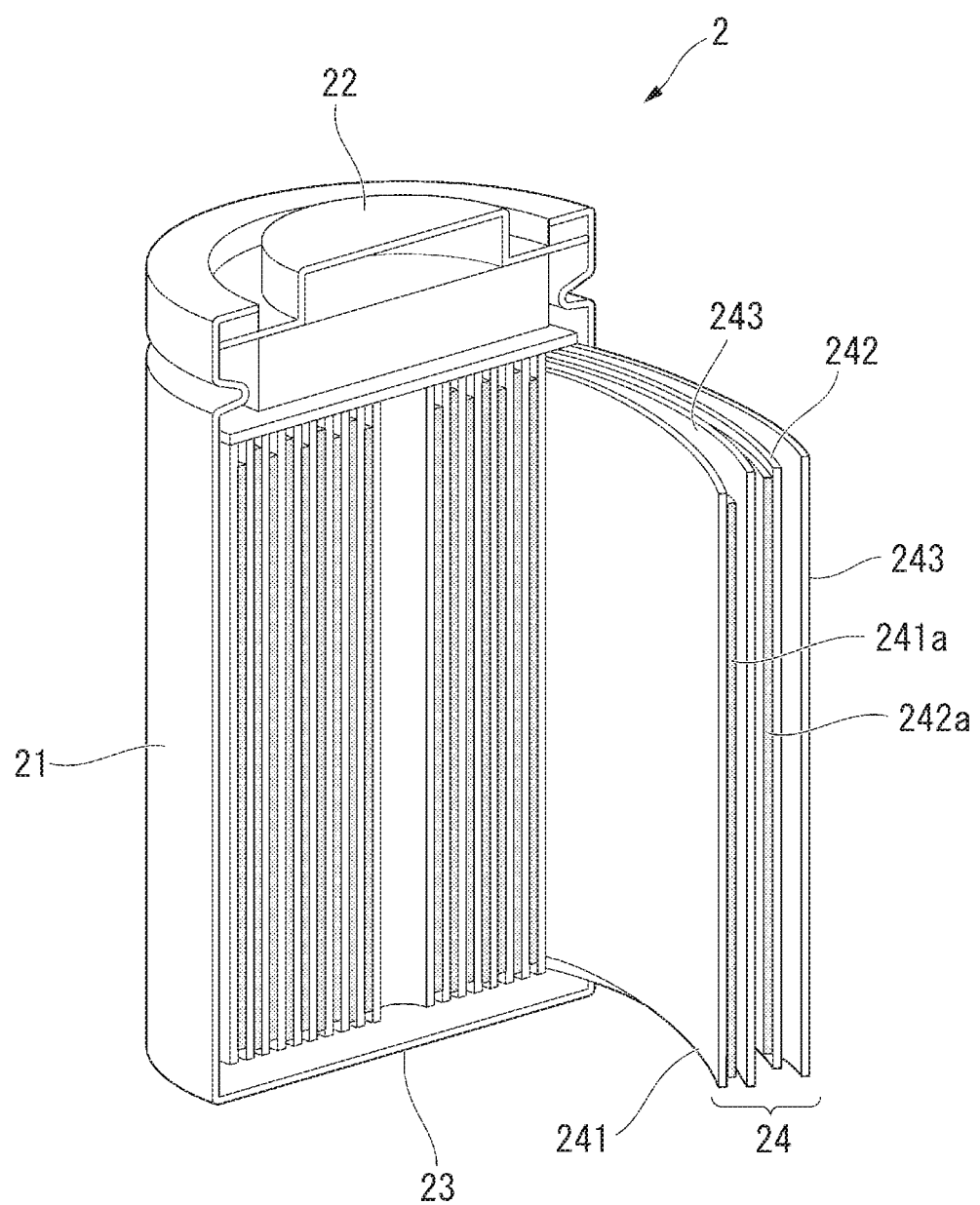
FIG. 2 is a partially cross-sectional, exploded perspective view of a lithium-ion battery according to an embodiment of the present invention.

As illustrated in FIG. 2, the lithium-ion battery 2 according to the present embodiment may include a bottomed cylindrical exterior body 21 having a bottom part that constitutes a negative electrode terminal 23, a positive electrode terminal 22 provided at an opening part of the exterior body 21, and an electrode body 24 provided inside the exterior body 21. An electrolyte solution may be enclosed in the lithium-ion battery 2.

The electrode body 24 may include a positive electrode collector 241 laminated with a positive electrode active material layer 241a, a negative electrode collector 242 laminated with a negative electrode active material layer 242a, and separators 243 interposed therebetween. The laminate of the positive electrode collector 241 and the positive electrode active material layer 241a may be referred to as a positive electrode while the laminate of the negative electrode collector 242 and the negative electrode active material layer 242a may be referred to as a negative electrode, and the positive electrode and the negative electrode may be collectively referred to as an electrode or electrodes. The positive electrode, the negative electrode, and the separators 243 may be wound up together and then inserted in the exterior body 21.

Figure 3:
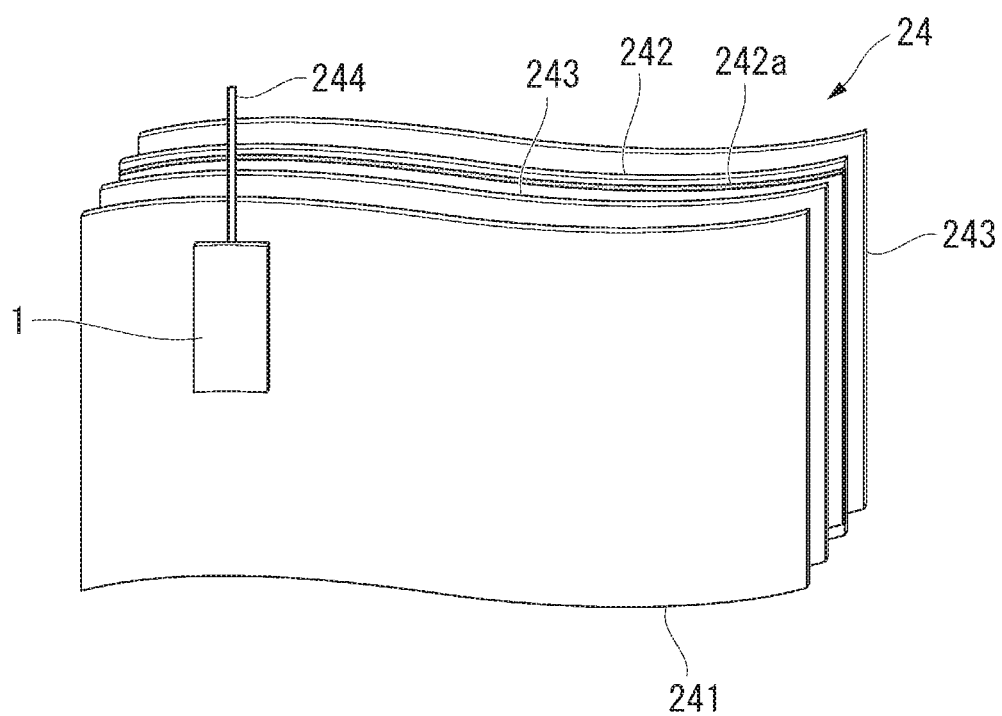
FIG. 3 is a developed, perspective view of an electrode body of the lithium-ion battery according to an embodiment of the present invention.

As illustrated in FIG. 3, a line-like or tape-like electrode lead-out tab 244 may be attached to the positive electrode collector 241 using the previously described pressure sensitive adhesive sheet for batteries 1, and the electrode lead-out tab 244 can thereby be electrically connected to the positive electrode collector 241. The electrode lead-out tab 244 may be electrically connected also to the above positive electrode terminal 22. The negative electrode collector 242 may be electrically connected to the negative electrode terminal 23 via an electrode lead-out tab which is not illustrated.

In general, the positive electrode collector 241 and the negative electrode collector 242 may be made of a material of metal such as aluminum while the electrode lead-out tab 244 may be made of a material of metal such as aluminum or copper.

The electrolyte solution used in the lithium-ion battery 2 may ordinarily be a nonaqueous electrolyte solution. Preferred examples of the nonaqueous electrolyte solution include those in which a lithium salt as the electrolyte is dissolved in a mixed solvent, of a cyclic carbonate ester and a lower chain carbonate ester. Examples of the lithium salt for use include fluorine-based complex salts, such as lithium hexafluorophosphate ($LiPF_6$) and lithium borofluoride ($LiBF_4$), and $LiN(SO_2Rf)_2 \cdot LiC(SO_2Rf)_3$ (where $Rf=CF_3$, $C_2F_5$). Examples of the cyclic carbonate ester for use include ethylene carbonate and propylene carbonate. Preferred examples of the lower chain carbonate ester include dimethyl carbonate, ethyl methyl carbonate, and diethyl carbonate.

The lithium-ion battery 2 according to the present embodiment can be manufactured by an ordinary method except that the previously described pressure sensitive adhesive sheet for batteries 1 is used for fixation of the electrode lead-out tab 244.

In the lithium-ion battery 2 according to the present embodiment, the electrode lead-out tab 244 is attached to the positive electrode 241 using the pressure sensitive adhesive sheet for batteries 1. The pressure sensitive adhesive sheet for batteries 1 includes the vapor-deposition insulating film 12 and can thereby have high insulation properties. According to this feature, even if an internal short circuit occurs in a part of the pressure sensitive adhesive sheet for batteries 1, the lithium-ion battery 2 according to the present embodiment can exhibit high safety because the temperature rise due to the internal short circuit can be suppressed.

It should be appreciated that the embodiments heretofore explained are described to facilitate understanding of the present invention and are not described to limit the present invention. It is therefore intended that the elements disclosed in the above embodiments include all design changes and equivalents to fall within the technical scope of the present invention.

For example, in the pressure sensitive adhesive sheet for batteries 1, the release sheet 14 may be omitted. In an embodiment, the pressure sensitive adhesive sheet for batteries 1 may be provided with one or more other layers between the base material 11 and the vapor-deposition insulating film 12 or between the vapor-deposition insulating film 12 and the pressure sensitive adhesive layer 13.

EXAMPLES

Hereinafter, the present invention will be described further specifically with reference to examples, etc., but the scope of the present invention is not limited to these examples, etc.

Example 1

1. Formation of Vapor-Deposition Insulating Film on Base Material

For one surface of a polyimide film (available from DU PONT-TORAY CO., LTD., product name "Kapton 100H," thickness: 25 μm, flame retardation level according to UL94 standard: V-0) as the base material, sputtering was performed with aluminum oxide (alumina) as the film formation material using a sputtering apparatus (available from SCREEN Finetech Solutions Co., Ltd., product name "VS-R400F"). Through this operation, a first laminate was obtained in which the vapor-deposition insulating film of alumina having a thickness of 100 nm was formed on one surface of the base material.

2. Formation of Coating Film of Pressure Sensitive Adhesive Composition on Release Sheet A (meth)acrylic ester polymer was prepared using a solution polymerization method to copolymerize 80 mass parts of 2-ethylhexyl acrylate, 15 mass parts of lauryl methacrylate, and 5 mass parts of acrylic acid. The molecular weight of this polymer was measured using gel permeation chromatography (GPC), which will be described later. The weight-average molecular weight (Mw) was 750,000.

Then, 100 mass parts (solid content equivalent, here and hereinafter; of the obtained (meth)acrylic ester polymer and 3.72 mass parts of trimethylolpropane-modified tolylene diisocyanate (available from TOYOCHEM CO., LTD., product name "BHS8515"; as the isocyanate-based cross-linker were mixed and diluted with ethyl acetate to prepare a coating liquid of the pressure sensitive adhesive composition.

A release sheet (available from LINTEC Corporation, trade name "SP-PET251130") was prepared in which one surface of a polyethylene terephthalate film was subjected to release treatment using a silicone-based release agent. The release-treated surface of the release sheet was coated with the coating liquid obtained as the above using a knife coater and heating treatment was performed at 120° C. for 1 minute. Through this operation, a second laminate was obtained in which the coating film of the pressure sensitive adhesive composition was laminated on the release-treated surface of the release sheet.

3. Production of Pressure Sensitive Adhesive Sheet for Batteries

The surface on the vapor-deposition insulating film side of the first laminate produced as above and the surface on the coating film side of the second laminate produced as above were attached to each other and then aged at 23° C. and 50% RH for 7 days. Through this operation, the pressure sensitive adhesive sheet for batteries was obtained in which the coating film of the pressure sensitive adhesive composition became the pressure sensitive adhesive layer. The thickness of the pressure sensitive adhesive layer was 9 μm. The thickness of the pressure sensitive adhesive layer was calculated through obtaining the total thickness of the pressure sensitive adhesive sheet for batteries and subtracting the thicknesses of the first laminate and the second laminate from the total thickness.

Example 2

The first laminate was produced in the same manner as in Example 1 except that the film formation material in the sputtering was titanium oxide (titania) and an vapor-deposition insulating film of titania having a thickness of 100 nm was formed on the base material. Then, a pressure sensitive adhesive sheet for batteries was produced in the same manner as in Example 1 using the first laminate.

Comparative Example 1

A pressure sensitive adhesive sheer, for batteries was produced in the same manner as in Example 1 except that the pressure sensitive adhesive layer on the release sheet was laminated directly on the base material without forming the vapor-deposition insulating film.

Comparative Example 2

The coating liquid of a pressure sensitive adhesive composition was prepared through mixing 100 mass parts of the (meth)acrylic ester polymer obtained in the same manner as in Example 1, 3.72 mass parts of trimethylolpropane-modified tolylene diisocyanate (available from TOYOCHEM CO., LTD., product name "BHS8515") as the isocyanate-based cross linker, and 155 mass parts of alumina fine particles (available from Denka Company Limited, product name "ASFP-20," average particle diameter: 0.26 μm) and diluting them with ethyl acetate.

The second laminate was obtained in the same manner as in Example 1 using the obtained coating liquid. The coating film of the pressure sensitive adhesive composition of the second laminate and a polyimide film (available from DU PONT-TORAY CO., LTD., product name "Kapton 100H," thickness: 25 μm, flame retardation level according to UL94 standard: V-0) as the base material were attached to each other and then aged at 23° C. and 50% RH for 7 days. Through this operation, a pressure sensitive adhesive sheet for batteries was obtained in which the coating film of the pressure sensitive adhesive composition became the pressure sensitive adhesive layer. The thickness of the pressure sensitive adhesive layer was 9 μm.

Here, the previously described weight-average molecular weight (Mw) refers to a weight-average molecular weight that is measured as a polystyrene equivalent value under the following condition using gel permeation chromatography (GPC) (GPC measurement).

<Measurement Condition>
Measurement Apparatus: HLC-8320 Available from Tosoh Corporation
GPC columns (passing through in the following order): available from Tosoh Corporation
TSK gel super H-H
TSK gel super HM-H
TSK gel super H2000
Solvent for measurement: tetrahydrofuran
Measurement temperature: 40° C.

<Testing Example 1> (Measurement of Adhesive Strength)

The adhesive strength of the pressure sensitive adhesive sheets for batteries in this Testing Example was measured in accordance with JIS Z0237: 2009 except the following operation.

The pressure sensitive adhesive sheet for batteries obtained in each of Examples and Comparative Examples was cut into a width of 25 mm and a length of 250 mm and the release sheet was then removed to obtain a test piece. The exposed pressure sensitive adhesive layer of the test piece was attached to an aluminum plate as an adherend using a rubber roller of 2 kg under an environment, of 23° C. and 50% RH. Immediately thereafter, the test, piece was peeled off from the above aluminum plate at a peel angle of 180° and a peel speed of 300 mm/min using a universal tensile tester (available from ORIENTEC Co., LTD., product name "TENSILON UTM-4-100") and the adhesive strength (N/25 mm) was thus measured. Results are listed in Table 1.

<Testing Example 2> (Evaluation of Electrolyte Solution Resistance)

The pressure sensitive adhesive sheet for batteries obtained in each or Examples and Comparative Examples was cut into a width of 11 mm and a length of 30 mm and the release sheet was then removed. Subsequently, the exposed pressure sensitive adhesive layer was attached to an aluminum plate as an adherend using a rubber roller of 2 kg under an environment of 23° C. and 50% RB, and this was used as a test piece. The test piece was enclosed in an aluminum-laminated bag together with a prepared liquid as the electrolyte solution and heated under an environment of 86° C. for 3 days. The prepared liquid was obtained through mixing ethylene carbonate and diethyl carbonate at a volume ratio of 1:1 to make a mixture liquid and dissolving lithium hexafluorophosphate ($LiPF_6$) in the mixture liquid at a concentration of 1 mol/L. Thereafter, the test piece was taken out, the pressure sensitive adhesive sheet for batteries was peeled off from the aluminum plate using tweezers, and confirmation was made as to how easily the sheet was peeled off. Then, the electrolyte solution resistance was evaluated on the basis of the following determination criteria. Results are listed in Table 1.

3 . . . The test piece was peeled at the interface between the pressure sensitive adhesive layer and the adherend.
2 . . . The pressure sensitive adhesive layer swelled and resulted in cohesive failure or transfer adhesion.
1 . . . Delamination occurred in the aluminum-laminated bag.

<Testing Example 3> (Evaluation of Battery Insulation Properties)

(1) Production of Positive Electrode

A positive electrode paste was prepared by mixing 100 mass parts of $LiNi_{0.82}Co_{0.15}Al_{0.03}O_2$ as the positive electrode active material, 1.0 mass parts of acetylene black, 0.9 mass, parts of polyvinylidene fluoride (binder), and an appropriate amount of NMP. Both surfaces of aluminum foil to be the positive electrode collector having a thickness of 20 μm were coated with the obtained positive electrode paste, which was dried and then rolled to produce a strip-like positive electrode having a width of 58 mm. Both surfaces near the center in the longitudinal direction of the positive electrode were provided with slit-like exposed parts exposed from one end part to the other end part of the positive electrode collector in its width direction. The width W or the exposed parts was set to 6.5 mm.

Then, a strip-like aluminum, positive electrode lead having a width of 3.5 mm and a length of 68 mm was overlapped and aligned with an exposed part of the positive electrode collector so that the length of the lead-out part would be 15 mm and the length of the overlapping part would be 53 mm, and the overlapping part was welded to the exposed part.

Thereafter, the pressure sensitive adhesive sheet for batteries obtained in each of Examples and Comparative Examples was attached to the positive electrode so as to cover the entire surface of the exposed part and the entire surface of the overlapping part. At that time, the pressure sensitive adhesive sheet for batteries was made to protrude by 2 mm from both end parts in the width direction of the positive electrode so that the exposed part, would be steadily covered with the pressure sensitive adhesive sheet for batteries. In addition, the pressure sensitive adhesive sheet for batteries was made to protrude by 2 mm onto the positive electrode active material layers also from both end parts in the width direction of the exposed part.

(2) Production of Negative Electrode

A negative electrode paste was prepared by mixing 100 mass parts of scale-like artificial graphite as the negative electrode active material having an average particle diameter of about 20 μm, 1 mass part of styrene butadiene rubber (SBR) (binder), 1 mass part of carboxymethylcellulose (thickener), and water. Both surfaces of copper foil to be the negative electrode collector having a thickness of 8 μm were coated with the obtained negative electrode paste, which was dried and then rolled to produce a strip-like negative electrode having a width of 59 mm. Both surfaces of the end part of the negative electrode on the winding end side were provided with exposed parts exposed from one end part to the other end part of the negative electrode collector in its width direction.

Then, a strip-like nickel negative electrode lead having a width of 3 mm and a length of 40 mm was overlapped and aligned with an exposed part of the negative electrode in the same manner as in the positive electrode, and the overlapping part was welded to the exposed part.

(3) Production of Set of Electrodes

The positive electrode and negative electrode obtained above were laminated via separators and wound to form a set of electrodes. At that time, the lead-cut part of the positive electrode lead was protruded from one end surface of the set of electrodes while the lead-out part of the negative electrode lead was protruded from the other end surface.

(4) Preparation of Nonaqueous Electrolyte

A nonaqueous electrolyte was prepared by dissolving $LiPF_6$ in a mixed solvent of ethylene carbonate, ethyl methyl carbonate, and dimethyl carbonate (volume ratio of 1:3:8) to a concentration of 1.4 mol/L.

(5) Production of Battery

The set of electrodes interposed between a lower JO insulating ring and an upper insulating ring was housed in an iron battery case (diameter 18 mm, height 65 mm) having an inner surface plated with nickel. At that time, the negative electrode lead was made to lie between the lower insulating ring and the bottom part of the battery case. In addition, the positive electrode lead was made to pass through a through-hole at the center of the upper insulating ring. Then, an electrode rod was made to pass through a hollow part at the center of the set of electrodes and a through-hole at the center of the lower insulating ring, and one end part of the negative electrode lead was welded to the inner bottom surface of the battery case. On the other hand, one end part of the positive electrode lead pulled out from the through-hole of the upper insulating ring was welded to the inner surface of a sealing plate provided with a gasket at the peripheral part. Thereafter, a groove was formed in the vicinity of the opening of the battery case, and the nonaqueous electrolyte was poured into the battery case to impregnate the set of electrodes. Then, the opening of the battery case was closed with the sealing plate, and the opening end part of the battery case was swaged to the peripheral part of the sealing plate via the gasket to complete a cylindrical nonaqueous electrolyte secondary battery (energy density of 700 Wh/L).

(6) Execution of Forced Internal Short. Circuit Test

Using the nonaqueous electrolyte secondary battery obtained above, the forced internal short circuit test for the battery was performed in accordance with JIS C9714: 2007. Nickel pieces of a standard size (height 0.2 mm, width 0.1 mm, L-shaped with a side of 1 mm, angle 90°) and a larger size (height 0.5 mm, width 0.2 mm, L-shaped with a side of 3 mm, angle 90°) than the standard size were prepared. The nickel pieces were disposed between the pressure sensitive adhesive sheet for batteries and the separators so as to penetrate the pressure sensitive adhesive sheet, for batteries. Then, the forced internal short circuit test was performed to measure the rise in temperature (° C.) of the battery side surface with a thermocouple. Results are listed in Table 1.

TABLE 1

| | Adhesive strength (N/25 mm) | Evaluation of electrolyte solution resistance | Evaluation of insulation properties (° C.) | |
|---|---|---|---|---|
| | | | Small pieces of standard size | Small pieces of large size |
| Example 1 | 2.8 | 3 | 10 | 15 |
| Example 2 | 2.7 | 3 | 10 | 15 |
| Comparative Example 1 | 2.9 | 3 | 36 | >100 |
| Comparative Example 2 | 0.4 | 1 | 10 | 15 |

As apparent from Table 1, the pressure sensitive adhesive sheets for batteries of Examples have satisfactory adhesive strength and electrolyte solution resistance as well as high insulation properties, and the temperature rise due to the forced internal short circuit test can be suppressed.

INDUSTRIAL APPLICABILITY

The pressure sensitive adhesive composition and the pressure sensitive adhesive sheet for batteries according to the present invention are suitable for use inside a lithium-ion battery and, in particular, suitable for attaching an electrode lead-out tab to an electrode.

DESCRIPTION OF REFERENCE NUMERALS

1 . . . Pressure sensitive adhesive sheet for batteries
   11 . . . Base material
   12 . . . Vapor-deposition insulating film
   13 . . . Pressure sensitive adhesive layer
   14 . . . Release sheet
2 . . . Lithium-ion battery
   21 . . . Exterior body
   22 . . . Positive electrode terminal
   23 . . . Negative electrode terminal
   24 . . . Electrode body
      241 . . . Positive electrode collector
      241a . . . Positive electrode active material layer
      242 . . . Negative electrode collector
      242a . . . Negative electrode active material layer
      243 . . . Separator
      244 . . . Electrode lead-out tab

The invention claimed is:

1. A lithium-ion battery in which two or more adherends are fixed in a state of being in contact with each other inside the battery using a pressure sensitive adhesive sheet for batteries, the pressure sensitive adhesive sheet comprising:
   a base material;
   a vapor-deposition insulating film free from an organic component provided on one surface side of the base material; and
   a pressure sensitive adhesive layer provided on a surface side of the vapor-deposition insulating film opposite to the base material,
   wherein the pressure sensitive adhesive sheet is used at a site at which there is a possibility of contact with an electrolyte solution of the battery.

2. The lithium-ion battery according to claim 1, wherein the two or more adherends are two or more conductors.

3. The lithium-ion battery according to claim 1, wherein a material that forms the vapor-deposition insulating film comprises at least one selected from the group consisting of aluminum oxide, titanium oxide, zirconium oxide, silicon oxide, aluminum nitride, silicon nitride, boron nitride, and barium sulfate.

4. The lithium-ion battery according to claim 1, wherein:
   the pressure sensitive adhesive layer is constituted of an acrylic-based pressure sensitive adhesive which contains a (meth)acrylic ester polymer, and
   the (meth)acrylic ester polymer contains (meth)acrylic alkyl ester in which the carbon number of alkyl group is 10 to 20, as the monomer unit which constitutes the polymer.

\* \* \* \* \*